United States Patent

Isaksson et al.

[11] 3,960,263
[45] June 1, 1976

[54] TRANSPORT DEVICE FOR REACTOR FUEL ROD CLADDING TUBES

[75] Inventors: Conny Isaksson, Vallingby; Lars-Erik Nordin, Taby; Curt Olsson, Bandhagen; Thorbjorn Sahlin, Vasteras, all of Sweden

[73] Assignee: Aktiebolaget ASEA-ATOM, Vasteras, Sweden

[22] Filed: Dec. 24, 1974

[21] Appl. No.: 536,230

[30] Foreign Application Priority Data
Dec. 31, 1973 Sweden ............................... 7317617

[52] U.S. Cl. ................................. 198/170; 198/203
[51] Int. Cl.² ........................................... B65G 19/00
[58] Field of Search .......... 198/170, 171, 168, 203, 198/34; 214/1 P; 104/172 B

[56] References Cited
UNITED STATES PATENTS 1,859,486   5/1932   Aimes ............................ 198/170 X
3,516,214   6/1970   Focke et al. ..................... 198/170 X Primary Examiner—Robert J. Spar
Assistant Examiner—James M. Slattery

[57] ABSTRACT

A device for transporting nuclear fuel rod cladding tubes transversely along a production line has a travel surface for the tubes and a transport chain running in the direction of transport parallel to the travel surface. The chain has a plurality of two-armed levers pivotally mounted thereon and springs pulling these levers in the direction of the travel of the chain. The levers have rollers at their ends which can engage between tubes on the travel surface. The springs are of such strength that the resistance to movement of a predetermined number of tubes prevents them from rising up, so that the rollers roll underneath the tubes, but permits them to rise up when a small number of tubes is in front of them to engage the tubes and pull them along the track. This provides in effect a storage if too many tubes are found on the track at any one time.

3 Claims, 4 Drawing Figures

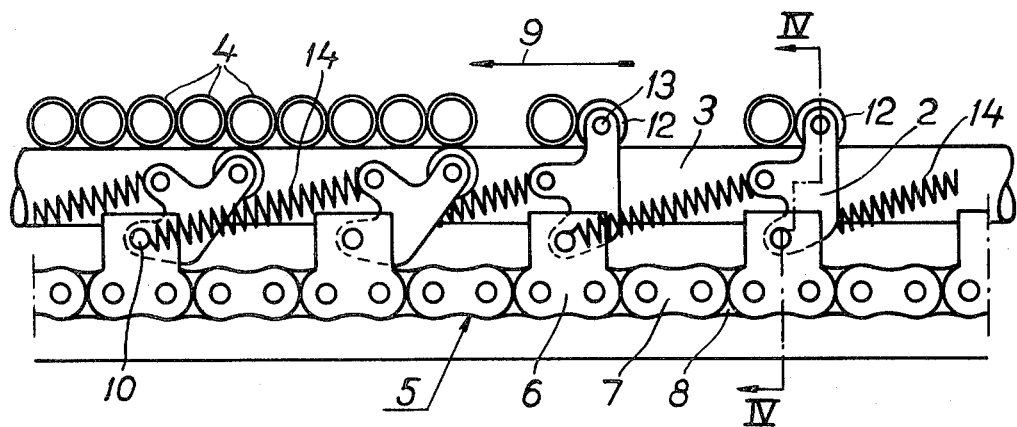
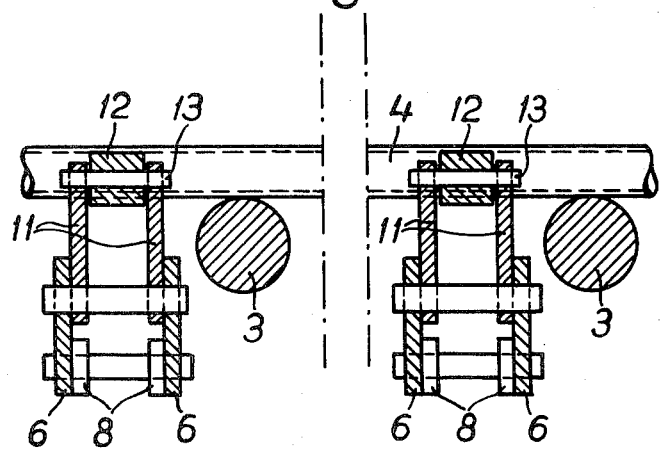

TRANSPORT DEVICE FOR REACTOR FUEL ROD CLADDING TUBES

BACKGROUND OF THE INVENTION

1. Field of the Invention

The present invention relates to a transport device for transporting reactor fuel rod cladding tubes transverse along a production line, comprising at least one member provided with a travel surface for said cladding tubes and a transport chain running in the direction of transport and parallel to the travel surface, said transport chain having a plurality of carriers arranged one after the other in the direction of transportation. More specifically, the invention relates to a conveyor having buffer storage between operating stations in a production line for reactor fuel rods which are transported in a direction perpendicular to the longitudinal axes of the fuel rods.

2. The Prior Art

In a device according to the invention, the transport chain can be driven with an even, invariable speed even if pauses or variations in the working pace occur at some operating station. This is achieved by applying the principle, known per se, of letting the space between two operating stations be used as a buffer storage for product units coming from one of the stations.

A transport device according to the invention is intended for transporting reactor fuel rods between operating stations representing different stages in the production.

Summary of the Invention

According to the invention, a travel surface is provided for the tubes and a transport chain runs in the direction of transport parallel to the travel surface. The chain has carriers arranged one after another in the direction of its movement. Each of these carriers has rotatably mounted on it a two-armed carrier lever. Springs pull these levers around their pivots in the direction of travel of the chain. The springs are of such strength that they will only move rollers which are mounted on the ends of the levers up between the tubes when a predetermined small number of tubes is in front, whereas if the number of tubes is large the rollers cannot rise between the tubes but will roll on their bottom surfaces. This provides a storage system if the tubes are being fed along too rapidly.

BRIEF DESCRIPTION OF THE DRAWINGS

The invention will be described in the following with reference to the accompanying drawings, in which FIGS. 2 and 3 show details of the same production line seen from the side, that is, in a direction perpendicular to the direction of transportation, and FIG. 4 shows a part of a section along the line IV—IV of FIG. 3.

DESCRIPTION OF THE PREFERRED EMBODIMENTS

Figure 1:
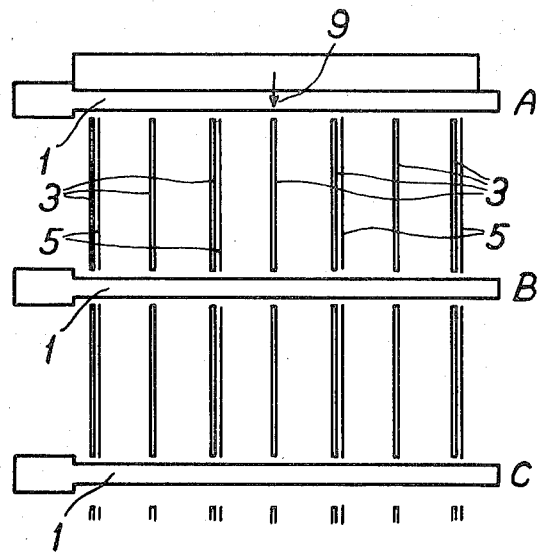
FIG. 1 shows part of a production line for reactor fuel rods in a vertical view from above.
Figure 2:
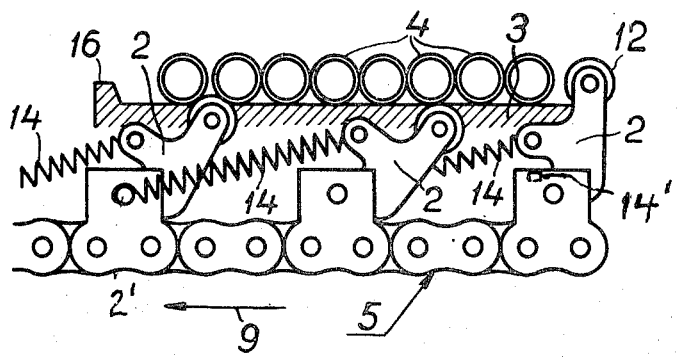

In the drawings, A, B, C designate three different operating stations. At each station there is a long working table 1 adapted for placing almost equally long thin-walled fuel rod cladding tubes, which are not shown in FIG. 1. From operating station A the cladding tube is moved transversely and is placed at the end portions of a plurality of substantially horizontal, solid steel spars 3, which together provide sufficient travel surface for the cladding tubes. In FIGS. 2, 3, and 4 the cladding tubes are shown and designated 4. These are transported from station to station with the help of a transport chain 5, whose links are designated 6, 7 and 8. The direction of transportation is indicated by the arrow 9. Each pair of links 6 supports a shaft 10, on which a carrier arm 2 formed of two arms 11 is rotatably mounted at 2'. At the outer end of the carrier arm 2 a carrier roll 12 is mounted so as to be able to rotate about a horizontal shaft 13 which is transversely oriented in relation to the longitudinal direction of the transport chain 5.

Each carrier arm 2 is subjected to a torsional moment by means of a spring 14 and provided with a stop member 14', and turning in a counterclockwise direction past the limit position shown at the extreme right of FIG. 2 is not possible. At this limit position the roller 12 has its highest level in relation to the surface on which the cladding tubes 4 are positioned, that is, in relation to the supporting surface of the beams 3. The carrier arms 2 are held by the springs 14 in the above-mentioned limit position for as long as they are not in mechanical contact with the cladding tubes 4. According to the invention, the springs 14 are dimensioned and adjusted in such a manner that the torque exerted by the springs is only sufficient for carrying along a group of cladding tubes, if the number does not exceed a certain, relatively low value. In the example described in connection with the drawings this value is chosen to be equal to 1. As shown in FIG. 2, the carrier 2 is pulled backwards when it strikes against a group containing a plurality of adjacent cladding tubes 4 even when the group is free to move in the direction of travel. Then the carrier roller 12 rolls on the undersides of the tubes and finally sets the front tube in motion. If the spring 14 had been somewhat more taut, the carrier arm 2 would instead have moved in between the third and fourth or perhaps between the fourth and fifth cladding tubes and — in agreement with the inventive idea — even with the somewhat more taut spring the carrier would only have had to move a smaller part of the group of tubes, and unallowable stresses on the tubes would have been avoided.

The eight tubes shown in FIG. 2 constitute a buffer storage between two operating stations. By means of the carrier of the transport chain one tube at a time is moved on to a stop edge 16 located immediately in front of the next operating station, where it may be removed from the spars 3. If the tube is not removed quickly enough, a tube transported by the next carrier will add to the growth of a buffer storage.

The right-hand portion of FIG. 3 shows a chain section working at full transport capacity, whereas the left-hand portion shows a buffer storage which is building up. Feeding units from such a buffer storage by applying a force at the very back of the row is a well-known principle, but it is not very suitable when it is a question of sensitive object, for example reactor fuel rods, and it implies that the feeding force increases with the size of the buffer storage, so the allowable number of buffer-stored tubes will be far less than when using an arrangement according to the invention.

A transport device according to the present patent application can be constructed in many different ways within the scope of the invention.

Instead of a number of steel spars 3 a table provided with slits may be used, and in some cases only one spar may be sufficient. Instead of a chain it is possible to use an endless band of rubber or the like. The cladding tubes may be arranged with vertical shafts and with supports against a wall, the feeding then taking place by means of carrier arms which are rotatable in a horizontal plane.

Instead of a plurality of spars as a roll conveyor it is also possible to use a plane or a curved table, which does not have to be provided with longitudinal gaps for the carrier arms, and to use a transport chain or the like which is arranged across the table and the carrier arms of which are rotatable in a vertical plane.

We claim:

1. Transport device for transporting reactor fuel rod cladding tubes (4) of circular cross-section transversely along a production line, comprising at least one member (3) provided with a travel surface for said cladding tubes and a transport chain (5) running in the direction of transport and parallel to the travel surface, said transport chain (5) having a plurality of carriers arranged one after the other in the direction of transportation, each carrier comprising a carrier arm (2) which is attached by its inner end to the transport chain (5) and which is rotatable around a shaft (2') directed transversely to the chain; and spring means for keeping the carrier arm (2) in gripping position at least as long as the carrier arm is only affected by the spring means, said spring means including means to exert a force of such a value that the carrier arm by contact with a movable group of tubes arranged adjacent to each other on the travel surface and of a number greater than a predetermined number is turned so far back that its carrier effect ceases, and of such a value that the carrier arm (2) after having passed all of said group of tubes with the exception of such predetermined number of tubes in front of the carrier is pulled by the spring means (14) into a gripping position between two cladding tubes of said group.

2. Transport device according to claim 1, in which the spring means (14) are adapted to pull the carrier (2) into said gripping position only when one cylindrical body still remains in front of the carrier.

3. Transport device according to claim 1, in which the outer end of said carrier arm (2) is provided with a roll (12).

* * * * *